United States Patent [19]

Slinker

[11] 4,095,832
[45] Jun. 20, 1978

[54] ROTATING COOKING SPATULA

[76] Inventor: Keith Harold Slinker, P.O. Box 526, Lexington Park, Md. 20653

[21] Appl. No.: 776,185

[22] Filed: Mar. 10, 1977

[51] Int. Cl.$^2$ ............................................. A47J 43/28
[52] U.S. Cl. ........................................ 294/8; 99/394; 99/402
[58] Field of Search ................. 294/7, 8; 99/393, 394, 99/397, 402, 409, 421 A, 424, 426, 427, 395

[56] References Cited

U.S. PATENT DOCUMENTS

| | | | |
|---|---|---|---|
| 614,016 | 11/1898 | Macduffee | 294/8 |
| 657,801 | 9/1900 | Vogel | 294/8 |
| 1,219,818 | 3/1917 | Hanson | 294/8 |
| 1,869,299 | 7/1932 | Bracht | 294/8 |
| 2,387,621 | 10/1945 | Stangle | 99/402 X |
| 2,567,091 | 9/1951 | Whitnah et al. | 294/7 |
| 2,681,001 | 6/1954 | Smith | 99/402 |

Primary Examiner—Johnny D. Cherry
Attorney, Agent, or Firm—M. Ted Raptes

[57] ABSTRACT

A rotating cooking spatula for use in the cooking and turning of items of food such as eggs, hamburgers, and the like. When cooking and/or frying foods, the rotating spatula device of this invention would be used to pick up the food item. The user then by operating appropriate control mechanism rotates in turn the especially configured spatula receptacle with cover top approximately 180° in order to turn the food item over. The item of food then can be slid out of the spatula tray back on to the frying surface. However, the spatula tray itself may be used to retain the food item and also to effect the cooking thereof. One embodiment uses a rotatable knob together with a 180° limit stop structure. Another embodiment employs a slide and helical thread structure to effect the 180° turning of the spatula tray structure. The third embodiment employs a slide knob together with rack and pinion structure connected to the slide knob by a flexible cable in order to effect the turning function. A resilient flexible connection connects all embodiments to the two-part spatula tray having a normally lower portion of slightly larger size than the top cover portion. In all embodiments the far end of both the bottom and top receptacle tray structure is open for easy ready reception of the food item therewithin.

9 Claims, 7 Drawing Figures

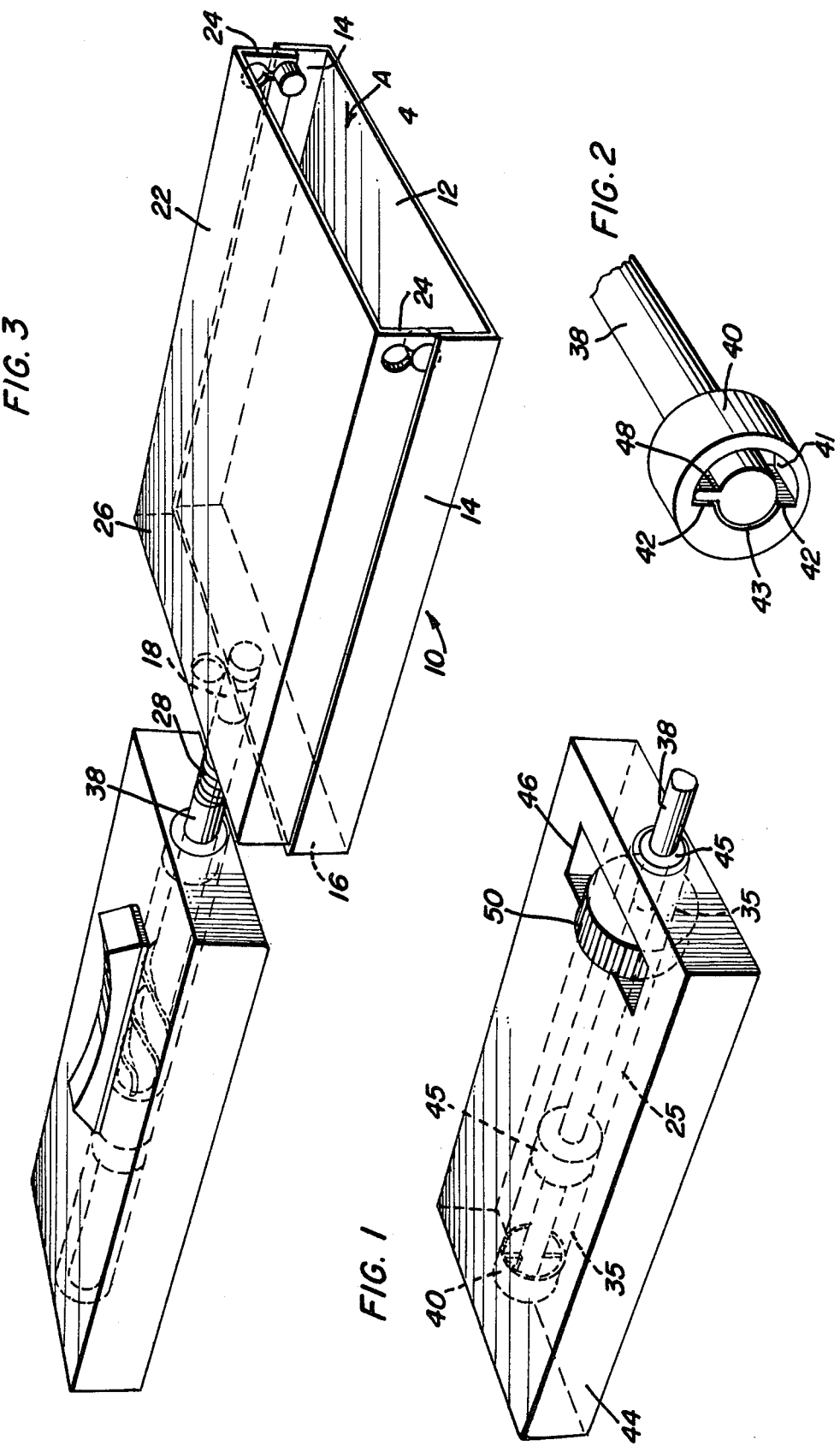

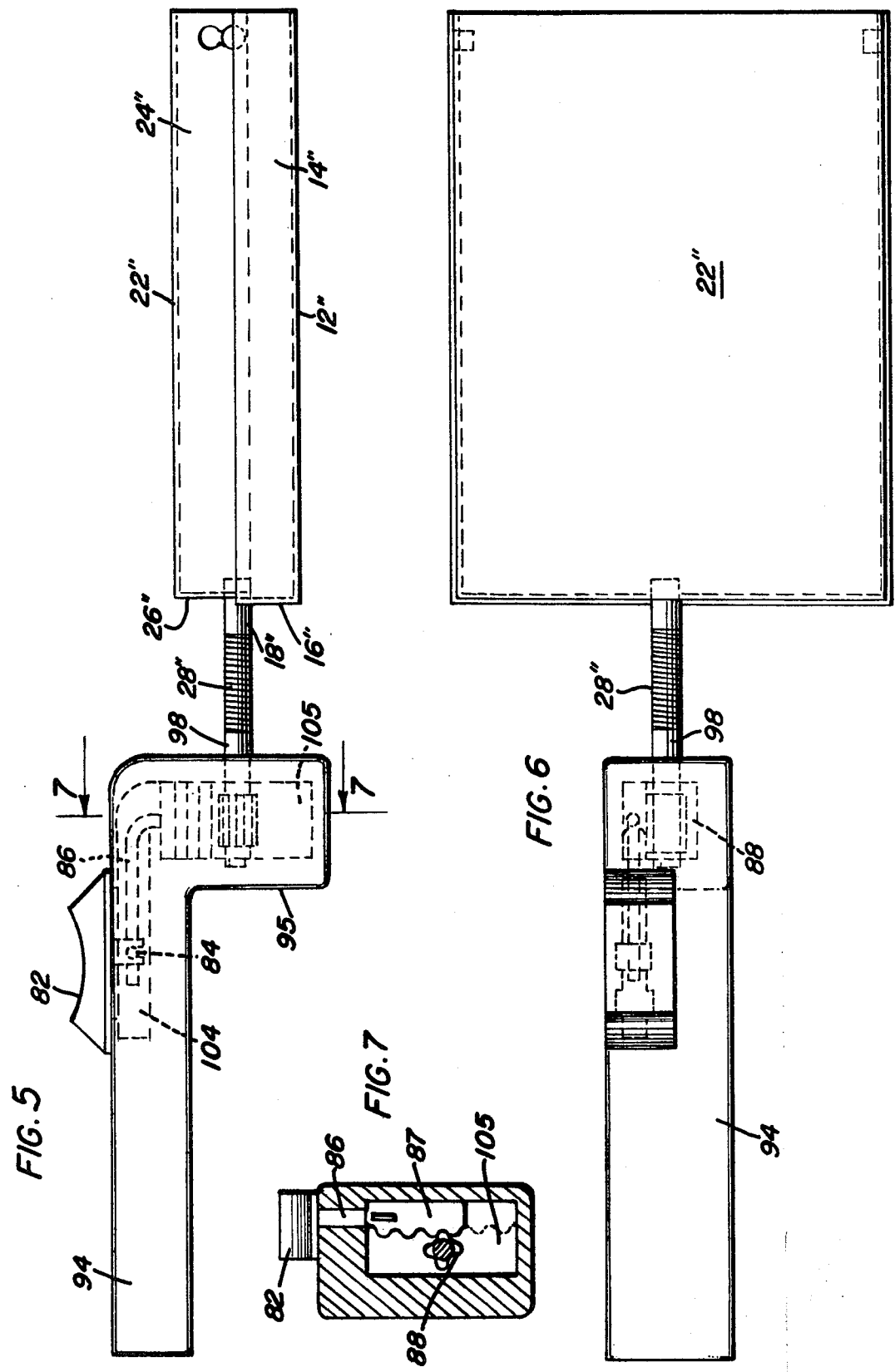

ROTATING COOKING SPATULA

BACKGROUND OF THE INVENTION

1. Field of the invention

This invention relates generally to devices for use in cooking foods which are normally fried and specifically in a rotatable spatula structure which may pick up food and turn the same over for redepositing upon the original cooking surface, or may be used as a cooking structure in and of itself.

2. Description of the prior art

A common problem of well-known type devices for flipping over items of food being cooked is that they normally do not provide structure to prevent the items of food from sliding off a side edge of the structure.

Another problem of known type devices is that they are primarily designed for cake type food items such as pancakes, and the like. They are not generally designed for cooking hamburgers, eggs, and the like.

Another problem of known type devices is that they are unduly complicated and expensive to purchase initially as well as requiring a fair amount of maintenance.

A further problem of known type devices is that they are not designed for the cooking of items of food directly upon or within the structures themselves.

Known prior art patents which may be pertinent to this invention are as follows:

U.S. Pat. No. 1,553,289 issued Sept. 8, 1925
U.S. Pat. No. 1,575,275 issued Mar. 2, 1926
U.S. Pat. No. 1,897,999 issued Feb. 21, 1933
U.S. Pat. No. 2,033,635 issued Mar. 10, 1936
U.S. Pat. No. 2,397,665 issued Apr. 2, 1946
U.S. Pat. No. 2,601,360 issued June 24, 1952
U.S. Pat. No. 3,761,120 issued Sept. 25, 1973.

None of these known prior art devices offers the new and unique features of the invention disclosed herein.

SUMMARY OF THE INVENTION

An object of the present invention is to provide a rotating cooking spatula which may be used in cooking of items of food such as eggs, hamburgers, and the like and can be used to pick up such items from the conventional type frying pan or other cooking surface being used. The spatula device of this invention then may be used to turn the food items over completely, i.e. 180° rotation from the original position, and then redeposit the food item on the cooking surface.

Another object of the present invention is to provide a rotating cooking spatula which not only may be used to turn the food completely over, but also may be used to cook the food therewithin.

A further object of the invention is to provide a spatula device which may be rotated at least 180° from an original position for complete turning over items of food being cooked and which also is provided with a substantially complete enclosure for positive retention of the food items therewithin.

A still further object of this invention is to provide a rotating cooking spatula which may be easily operated by a user of the device, and in a safe, completely positive manner.

An additional further object of this invention is to provide a new receptacle tray structure for the food pick up portion and cooking portion of the device which is substantially enclosed except for the pick up end which is open for reception of the food. This receptacle is also designed to be easily separated for the purpose of cleaning the food supporting and touching portions thereof.

The rotating spatula structure of this invention as disclosed herein offers a number of new and unique features not heretofore found in the art. The basic receptacle tray unit for the pick up and cooking portion of the spatula device consists of a primary pick up and cooking surface of flat configuration with three upstanding flanges or walls provided thereon. Another complementary cover portion positively interlocks therewith by means of specially configured slots and projections provided between the two units. The upper cover secondary unit is preferably of slightly smaller size than the primary receptacle unit, but of generally the same general configuration. When the two units are assembled together, the open side of the substantially box-like receptacle may be used for receiving items of food. The diametrically opposite end of the receptacle tray is connected by resilient flexible cable structure for permitting a certain amount of flexible bending between the receptacle spatula tray and the operating handle mechanism.

Three different embodiments of operating handle mechanism are disclosed herein. The first embodiment comprises an elongated handle member having an aperture transversely thereof and another aperture longitudinally along the center axis thereof for reception of an actuating rod member connected to the flexible cable portion of the device. This operating and rotating rod member is suitably supported within bearings mounted in the handle structure and also directly and positively connected to a rotating knob for actuation thereby. A 180° limit stop structure is also provided at the extreme end of the rotating rod member to limit the turning movement thereof.

The second embodiment of the invention eliminates the transverse aperture and replaces it with a longitudinal aperture in alignment with the first longitudinal aperture for containing the rotating rod member. In this embodiment the rotating rod member is provided with external threads arranged in a helical manner along the outer circumference of the rod which in turn engages with a longitudinally movable actuating nut. This actuating nut is provided with internal thread grooves for complementary mating with the external threads of the rotating rod. A slide knob member is attachably secured to this slidable nut member for actuation thereof. The first longitudinal recess provides built-in limit stops at each end thereof which inherently prevent the rotation of the primary rod member more than 180°. Longitudinal bearings are also provided with this embodiment for supporting the rotating rod member within the handle structure.

A third embodiment employs a modified handle structure of generally L-shaped configuration having a longitudinal recess in the main length of the handle for reception of a slide member which in turn is connected by means of a flexible connecting member to a movable rack element. This rack element is mounted in the other portion of the L-shaped handle and in turn engages with a pinion mounted on the rotating rod which supports the spatula receptable structure. Again the limits of movement of the slide mechanism within the main handle limits and determines the 180° rotation of the spatula receptacle support rod.

While the rotating spatula structure of this invention may be used to pick up items of food from a frying pan and the like, and then flip such food a full 180°, and then in turn redeposit the food items back upon the cooking pan or the cooking surface, it is also designed to be a cooking element in and of itself. That is the structural arrangement and thickness of the spatula receptacle unit is such that items of food may be placed therewithin, and then the entire receptacle unit heated by any desired means and used as a miniature cooking unit in and of itself. At the appropriate time for the food to be turned over, the operating mechanism is appropriately actuated and the food then turned with the top cover portion of the receptacle then becoming the support and cooking surface.

These, together with other objects and advantages which will become subsequently apparent reside in the details of construction and operation as more fully hereinafter described in the claims, reference being had to the accompanying drawings forming a part hereof, wherein like numerals refer to like parts throughout.

BRIEF DESCRIPTION OF THE DRAWINGS

FIG. 1 is a perspective view of the handle and actuating mechanism of the first embodiment.

FIG. 2 is an elevational view of the 180° limit structure for the first embodiment.

FIG. 3 is a perspective view of the second embodiment of the invention.

FIG. 5 is a side elevational view of the third embodiment of the invention, with a handle section partly broken away.

FIG. 6 is a top plan view of the third embodiment with a portion of the handle structure broken away.

FIG. 7 is a cross-sectional view taken generally along line 7—7 of FIG. 5.

DESCRIPTION OF THE PREFERRED EMBODIMENT

Figure 4:
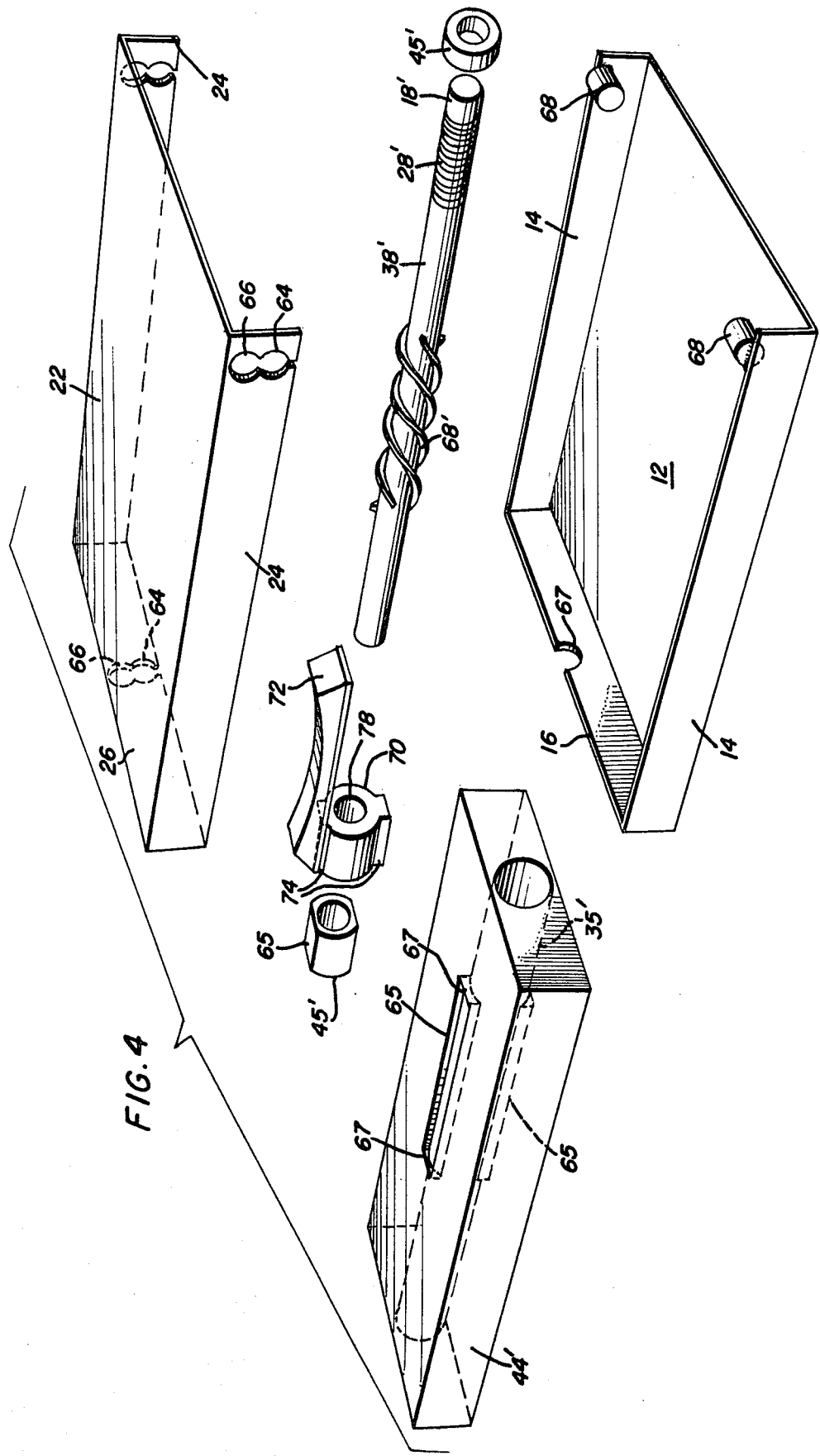
FIG. 4 is an exploded view of the component parts of the second embodiment.

Referring to FIG. 3 of the drawings, reference numeral 10 indicates in general the spatula receptacle unit of two-part construction which is common to all three embodiments of the invention. The primary main receptacle unit consists of a flat tray portion 12 having vertical flange portions 14 on the sides thereof and an end or back portion 16. A similar slightly smaller secondary tray unit which is used in the position shown as a top cover member consists of a flat portion 22 with side flanges 24 and a back flange 26. The secondary and top cover unit when mounted telescopically within the main receptacle unit together form a substantially complete enclosure except for the opening A at the one end thereof. The back wall 16 of the main receptacle tray unit is preferably fastened to a rotating rod 18 by welding or the like. This rod 18 is in turn flexibly connected by resilient cable or spring structure 28 to the main handle mechanism rotating rod 38. The aforesaid described structure is common to all of the embodiments of this invention.

Now looking at FIG. 1, the handle mechanism of the first embodiment will be described. A basic handle is an elongated body member 44 having a transverse slot 46 provided extending completely therethrough from the top to the bottom and having an elongated centrically aligned aperture 35 from the front end of the handle to the rear end thereof. Bearings 45 of any suitable material are provided within the aperture 35 for rotatably supporting the main rotating rod 38 therewithin. In this first embodiment a handle knob 50 is integrally fastened to rod 38 for rotation thereof when desired by a user. This rotation is accomplished by the user of the device using a thumb or fore finger to rotate the knob 50 by means of the portion which extends beyond the handle 44 structure. At the extreme rear end of the handle 44 is a 180° limit stop structure.

This limit stop structure may be best seen in the view of FIG. 2. In this view the overall ring 40 is provided internally thereof with a central aperture one half 41 of which is of greater diameter than the other half 43. Where these two halves meet abutments 42 are appropriately formed. The abutments 42 cooperate with the projection 48 provided on the extreme outer end of rotating rod 38 to limit the rotation of said rod to the 180° as aforesaid.

As can be readily visualized by looking at FIGS. 1, 2, and the receptacle spatula unit portion of FIG. 3, when an item of food is desired to be picked up, such as an egg being fried in a frying pan, the user of the device while holding handle 44 will move the overall device so that the leading edge of the opening A will scoop-up the egg onto the surface 12. The egg then will be completely contained within the receptacle spatula unit and by rotating knob 50 in the appropriate direction will flip the egg over and the other side of the egg will then be resting upon the tray portion 22 which is now on the bottom. The egg then may be easily redeposited upon the cooking surface or into the frying pan. However, just as easily the complete spatula receptacle structure may be directly engaged with a heating element and the entire receptacle spatula structure used as a cooking device. Thus, a conventional type frying pan or other cooking structure may be completely eliminated.

Looking at FIGS. 3 and 4, the connecting portion of the two-part receptacle unit as well as the second embodiment will be described in detail. As best seen in the exploded perspective view of FIG. 4, the lower portion of the two-part receptacle spatula unit has projection stubs 68 appropriately secured near the upper front corners of the side flanges 14 for appropriate mating with the specially configured recessees 64 and 66 as provided on the mating top cover side flanges 24. The back flange 16 of the bottom unit is provided with an aperture 67 which is directly welded to the rotating rod end 18. This rod stub 18 in turn then functions similar to the stubs 68 already mentioned. The top cover unit 22, 24, 26 then may be connected telescopically to and within the bottom unit 12, 14, 16 by means of the stub projections 18, and 68 in the recesses 64 or 66. This gives a two-dimensional thickness to the receptacle unit and if the projections are fitted into recesses 64 the overall distance between flat portion 12, and 22 of the two units will be greater than if the connection is by means of recesses 66. Thus, for cooking relatively thin items such as eggs and the like, the recesses 66 preferably would be the ones engaged so that the least distance will be between 12 and 22, while if thicker items of food such as hamburgers or steaks and the like are being cooked the recesses 64 would be used to create the maximum opening end and space between the cooking and supporting surfaces 12 and 22.

In the second embodiment the elongated handle structure is indicated by 44' and a central longitudinally extending aperture 35' is provided therewithin. Suitable longitudinal slots 65 appropriately connect the longitudinal aperture 35' with the outside surfaces of the handle 44'. The ends 67 of said slot 65 function as built-in limit structure for the operating slide knob and nut of this embodiment. The main rotating rod structure 38' is flexibly connected by cable 28' to the stub portion 18' in the manner of the first embodiment. Suitable bearings 45' support this rotating rod 38' within the aperture 35' of handle 44'. If it is desired to prevent rotation of these bearings within the handle, flat surfaces 65 may be appropriately provided thereon as shown by the left-most bearing 45' in view of FIG. 4. If this type bearing is used suitable flats would also be provided at the ends of the aperture 35' to complement and engage with the flat surfaces of the bearing. Mounted for movement along the central axis of the aperture 35' is a nut structure 70 provided with projections 74 which mate with the slots 65 provided in the handle. Appropriately fastened and removably attached to the upper projection 74 is an operating slide knob 72. The inner aperture 78 of the slide nut 70 is appropriately tapped and provided with helical grooves for complementary mating with the helically arranged thread 68' as provided on the main rotating rod 38'.

Thus, it can be easily visualized by looking at FIG. 3 of the drawings, when the slide knob 72 is moved longitudinally between the limit ends 67 and within slot 65, the slidable nut 70 will effect a positive drive rotation of the main rotating rod member 38' and in turn rotate the spatula receptacle structure 180°. The overall structure then may be used either as just a turning spatula, or as both a cooking utensil and turning structure.

Looking at FIGS. 5-7, the third embodiment of this invention will now be described. The spatula receptacle structure 12", 14", 16", and 22", 24" and 26", is substantially the same as that in the first two embodiments. However, the handle structure 94 has a depending portion 95, so overall the handle is generally an L-shaped configuration. A longitudinally extending recess 104 is provided in the portion 94 with another recess 105 provided in the depending portion 95. Mounted for slidable movement with and extending from the recess 104 is a thumb actuated slide knob 82 which is suitably connected at 84 to a flexible cable member 86. The cable member 86 terminates in a rack member 87. This rack member 87 is suitably provided with teeth along an edge thereof for engagement with a pinion 88 which is suitably attached to the rotating rod 98. Rod 98 is suitably connected with flexible cable structure 28" to the stub 18" which is in turn attached by welding or the like to the receptacle spatula structure and back wall 16" thereof as in the above embodiments.

As can be easily visualized by looking at these figures, an operator of this embodiment need merely hold the handle 94 in one hand and with the thumb of the same hand push and slide knob 82 longitudinally of the handle in order to effect the 180° rotation of the spatula receptacle structure. Thus, whatever food is being held by the spatula structure will be suitably flipped by actuation of the knob 82. The top and bottom portions of the recess 105, as best seen in FIG. 7, will limit the movement of rack member 87 to determine the limits of the 180° rotation. Thus, again the spatula receptacle unit will be in either the upright substantially horizontal position, or in the completely 180° inverted position.

The foregoing is considered illustrative only of the principals of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and novel is as follows:

1. A cooking utensil device comprising:
   means for turning food items while being cooked including:
   a combination supporting and cooking structure for reception of food items therewith consisting of a two-part receptacle unit, a first part having a substantially flat food supporting surface with three side walls around the perimeter thereof, a second part of similar configuration with a flat supporting surface having three side walls around the perimeter thereof, said second part is telescopically engageable with said first part, means for adjustably interlocking the said first and second telescopic parts together in a secure manner and yet permitting quick and easy separation thereof for the purpose of cleaning said parts, and when still engaged the overall unit may receive food through the one end opening thereof; handle structure; further means rotatably supporting said combination support and cooking structure from said handle structure, additional means associated with the handle structure for turning said rotatable further means in order to effect a corresponding turning of said combination support and cooking structure with food therewithin when desired by a user of the device comprising a support rod mounted for rotation in said handle, a flexible connection fastened to the outer end of said rod and a stub connected to said flexible connection which in turn is attached to said combination supporting and cooking structure.

2. The structure set forth in claim 1, together with means for adjustably interlocking the two telescopic parts together in a secure manner and yet permitting quick and easy separation thereof for the purpose of cleaning said parts.

3. The structure set forth in claim 1, together with structural means associated with the rotatable rod for limiting the rotational turning movement thereof to approximately 180° limits.

4. The structure set forth in claim 3, wherein the said additional means associated with the handle structure for turning the combination supporting and cooking structure includes a rotatable knob means for limiting the rotation of said rod to 180° limits and a cylindrical ring structure provided therewithin with limit abutments, and the rotatable rod has a complementary projecting member for association and engagement with said limit abutments.

5. The structure set forth in claim 3, wherein the additional means for effecting rotatable movement of the rod includes a slidable knob mounted in a longitudinally extending recess of the handle, and connected by suitable connection means to effect rotation of said support rod.

6. The structure set forth in claim 5, wherein the suitable connection means is by a slidable nut associated with the slidable knob, said slidable nut provided with helical grooves therewithin, said rotatable rod being provided with complementary helical threads thereon, and mating and engaging with the helical grooves within said slidable nut in order to effect rotation of the rod when the nut is moved longitudinally by actuation of the slidable knob.

7. The structure as set forth in claim 6, wherein the means for limiting 180° rotation of said rotatable rod consist of end abutments associated with the slidable nut to limit the amount of slidibility thereof.

8. The structure as set forth in claim 5, wherein the additional means associated with the handle structure for turning the combination supporting and cooking structure consists of a slidable knob mounted in a longitudinal recess with the handle, a flexible cable connection between said slidable knob and a rack member having teeth thereon also mounted within the handle structure, and a pinion mounted on the end of the rotatable rod and engaged with the teeth of the rack member for effecting rotation of the support rod and in turn the combination supporting and cooking structure when the slidable knob on the handle is moved longitudinally thereof by a user of the device.

9. A cooking utensil device comprising:
means for manually turning food items while being cooked including;
a combination support and cooking structure for reception of food items therewithin comprising a two-part receptacle unit, a first part having a substantially flat food supporting surface with three side walls around the perimeter thereof, a second part of similar configuration with a flat supporting surface having three side walls around the perimeter thereof, said second part telescopically engageable with said first part and when engaged the overall unit may receive food through the one end opening thereof; handle structure; rotatable support means connecting said handle structure with said combination support and cooking structure; said handle structure comprising turning means for turning said rotatable support means and to thereby effect a corresponding turning of said combination support and cooking structure with food therein; said turning means comprising structure adapted to be operated by one's thumb when holding said handle in one's hand.

* * * * *